(12) United States Patent
Klett et al.

(10) Patent No.: US 10,784,739 B2
(45) Date of Patent: Sep. 22, 2020

(54) RADIAL CLEARANCE IN A HYBRID MODULE

(71) Applicant: Schaeffler Technologies AG & Co. KG, Herzogenaurach (DE)

(72) Inventors: Reinhard Klett, Wooster, OH (US); Markus Steinberger, Macedonia, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 122 days.

(21) Appl. No.: 16/214,379

(22) Filed: Dec. 10, 2018

(65) Prior Publication Data

US 2020/0185996 A1   Jun. 11, 2020

(51) Int. Cl.
| | |
|---|---|
| *H02K 7/06* | (2006.01) |
| *H02K 3/46* | (2006.01) |
| *H02K 1/28* | (2006.01) |
| *H02K 3/32* | (2006.01) |
| *B60K 6/26* | (2007.10) |
| *H02K 1/27* | (2006.01) |

(52) U.S. Cl.
CPC ............... *H02K 3/46* (2013.01); *B60K 6/26* (2013.01); *H02K 1/2793* (2013.01); *H02K 1/28* (2013.01); *H02K 3/32* (2013.01); *B60Y 2200/92* (2013.01); *H02K 2203/12* (2013.01)

(58) Field of Classification Search
CPC ........ H02K 7/116; H02K 1/2793; H02K 3/46; H02K 1/28; H02K 3/32; H02K 2203/12; B60K 6/26; B60Y 2200/92

USPC ......... 310/83, 75 C, 90, 156.12–156.15, 310
See application file for complete search history.

(56) References Cited

U.S. PATENT DOCUMENTS

| | | | | |
|---|---|---|---|---|
| 7,489,114 | B2* | 2/2009 | Nomura | B60K 6/26 322/33 |
| 7,932,652 | B2* | 4/2011 | DeVeny | B60K 7/0007 180/65.51 |
| 8,636,091 | B2* | 1/2014 | Sanji | B60K 6/26 180/65.23 |
| 2010/0133026 | A1* | 6/2010 | Kim | B60W 10/02 180/65.22 |
| 2011/0039649 | A1* | 2/2011 | Tanae | B60W 10/06 475/5 |

(Continued)

FOREIGN PATENT DOCUMENTS

DE      102016204426 A1    9/2017

*Primary Examiner* — Thanh Lam
(74) *Attorney, Agent, or Firm* — Kevin Parks

(57) ABSTRACT

A hybrid module includes a housing, a bearing, and an electric motor. The electric motor has a rotor with a rotor carrier radially positioned by the bearing in the housing. The rotor carrier has an annular ring comprising an annular ring outer surface with a first outer diameter. The rotor has a plurality of rotor segments installed on the rotor carrier. The plurality of rotor segments include an outer circumferential surface with a second outer diameter, less than the first outer diameter. In some example embodiments, the electric motor has a stator with a bobbin core and a bobbin shield installed on the bobbin core. In some example embodiments, the bobbin core is at least partially radially aligned with the plurality of rotor segments, and the bobbin shield is at least partially radially aligned with the annular ring.

20 Claims, 2 Drawing Sheets

(56) References Cited

U.S. PATENT DOCUMENTS

| | | | |
|---|---|---|---|
| 2012/0242199 A1* | 9/2012 | Iwase | F16D 25/0638 310/68 B |
| 2016/0105060 A1* | 4/2016 | Lindemann | B60K 6/442 701/22 |
| 2016/0109010 A1* | 4/2016 | Lindemann | B23P 15/00 192/3.21 |

* cited by examiner

RADIAL CLEARANCE IN A HYBRID MODULE

TECHNICAL FIELD

The present disclosure relates generally to a hybrid module, and more specifically to radial clearance in a hybrid modules.

BACKGROUND

Commonly-assigned U.S. patent application Ser. No. 15/706,310 titled Hybrid Module Shipping Assembly to MOASHERZIAD et al. shows and describes a shipping dome for radially positioning hybrid module components to prevent damage during shipping.

SUMMARY

Example aspects broadly comprise a hybrid module with a housing, a bearing, and an electric motor. The electric motor has a rotor with a rotor carrier radially positioned by the bearing in the housing. The rotor carrier has an annular ring comprising an annular ring outer surface with a first outer diameter. The rotor has a plurality of rotor segments installed on the rotor carrier. The plurality of rotor segments include an outer circumferential surface with a second outer diameter, less than the first outer diameter. In some example embodiments, the electric motor has a stator with a bobbin core and a bobbin shield installed on the bobbin core. In some example embodiments, the bobbin core is at least partially radially aligned with the plurality of rotor segments, and the bobbin shield is at least partially radially aligned with the annular ring.

In an example embodiment, the hybrid module has a first radial gap disposed between the outer circumferential surface and the bobbin core, and a second radial gap, less than the first radial gap, disposed between the annular ring outer surface and the bobbin shield. In an example embodiment, the hybrid module is arranged such that the annular ring can contact the bobbin shield and none of the plurality of rotor segments can contact the bobbin core. In some example embodiments, the stator has a plurality of bobbin shields comprising respective inner circumferential surface segments forming a first inner diameter, and a plurality of bobbin cores comprising respective inner circumferential surface segments forming a second inner diameter. In an example embodiment, a radial distance between the first outer diameter and the first inner diameter is less than a radial distance between the second outer diameter and the second inner diameter.

In an example embodiment, the rotor has a first distal end and a second distal end, axially opposite of the first distal end. The bearing is disposed proximate the first distal end, and the annular ring is disposed proximate the second distal end. In some example embodiments, the hybrid module has a torque converter with an impeller hub arranged for radial positioning by a transmission. In an example embodiment, the impeller hub includes an impeller hub bushing arranged for radially positioning the torque converter on a shaft of the transmission.

Other example aspects broadly comprise a rotor carrier for a hybrid module. The rotor carrier includes a tubular section for receiving a plurality of rotor segments, and an annular ring for fixing to a torque converter. The tubular section includes a first distal end and a second distal end, axially opposite of the first distal end. The annular ring extends radially out from the second distal end and is integrally formed from a same piece of material as the tubular section. The annular ring includes a first outer diameter and a circumferential protrusion extending axially towards the first distal end. The circumferential protrusion has a second outer diameter smaller than the first outer diameter.

In an example embodiment, the rotor carrier includes a rotor carrier flange extending radially inward proximate the first distal end. The rotor carrier flange has a positioning diameter for receiving a bearing. In an example embodiment, the tubular section includes an outer circumferential surface. The rotor carrier has an axial protrusion extending radially outward from the outer circumferential surface or an axial slot extending radially inward from the outer circumferential surface.

In some example embodiments, a rotor for a hybrid module includes the rotor carrier, a plurality of rotor segments installed on the tubular section, and a first end plate disposed axially between the plurality of rotor segments and the circumferential protrusion. In an example embodiment, the rotor has a second end plate disposed axially between the plurality of rotor segments and the first distal end.

In some example embodiments, an electric motor for a hybrid module includes a rotor with the rotor carrier, and a stator comprising a first bobbin shield with a radially inner surface at least partially radially aligned with the annular ring. In some example embodiments, the rotor has a plurality of rotor segments with a first axial width, and the stator has a bobbin core with a second axial width, greater than the first axial width. In an example embodiment, each of the plurality of rotor segments has at least one permanent magnet. In some example embodiments, the stator has a second bobbin shield, the first bobbin shield is installed on a first axial side of the bobbin core, and the second bobbin shield is installed on a second axial side of the bobbin core, opposite the first axial side. In an example embodiment, the electric motor has an electrical wire wrapped around the first bobbin shield, the second bobbin shield, and the bobbin core to form a plurality of windings.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
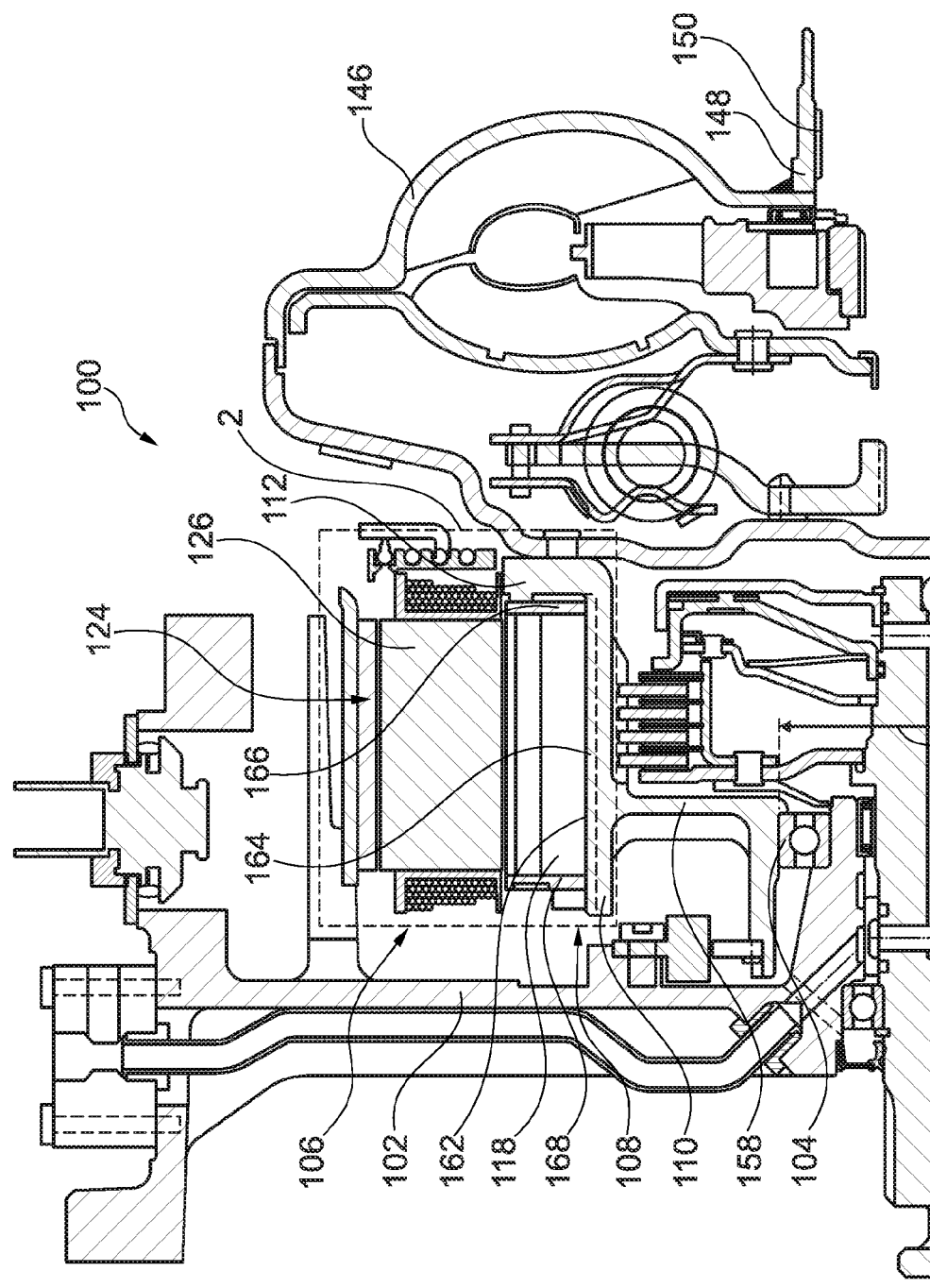
FIG. 1 illustrates a top-half cross-sectional view of a hybrid module according to an example aspect of the disclosure.
Figure 2:
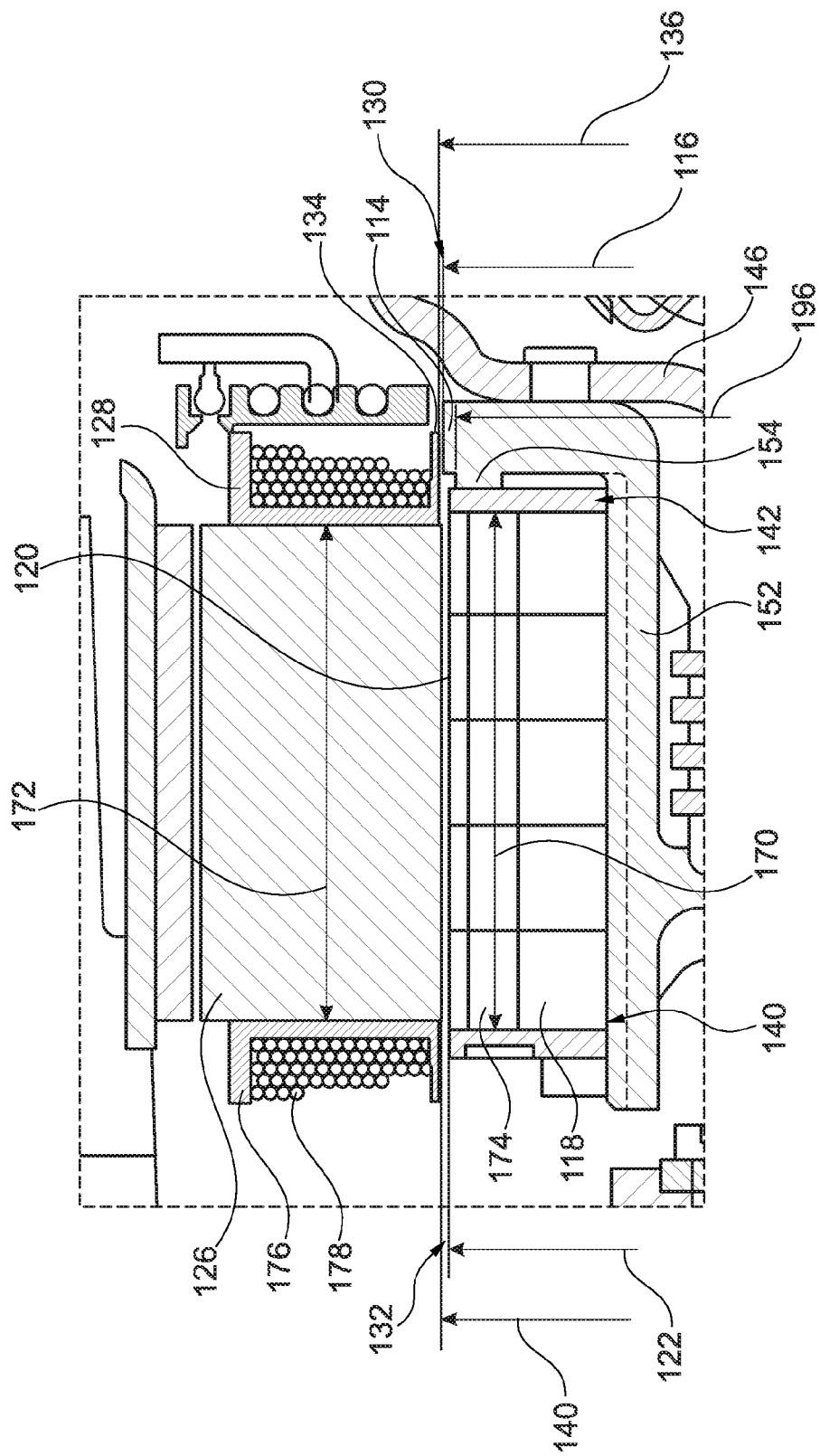
FIG. 2 illustrates a detail view of an electric motor for the hybrid module assembly of FIG. 1.

The following description is made with reference to FIGS. 1-2. FIG. 1 illustrates a top-half cross-sectional view of hybrid module assembly 100 according to an example aspect of the disclosure. FIG. 2 illustrates a detail view of a portion of electric motor 106 for hybrid module assembly 100 labeled 2 in FIG. 1. Hybrid module 100 includes housing 102, bearing 104 and electric motor 106. The electric motor includes rotor 108 with rotor carrier 110 radially positioned by the bearing in the housing. Rotor carrier 110 includes annular ring 112 with annular ring outer surface 114 with outer diameter 116. The rotor has a plurality of rotor segments 118 installed on the rotor carrier. Rotor segments 118 include outer circumferential surface 120 with outer diameter 122, less than outer diameter 116.

Electric motor 106 includes stator 124 with bobbin core 126 and bobbin shield 128 installed on the bobbin core. The bobbin core is at least partially radially aligned with the plurality of rotor segments, and the bobbin shield is at least partially radially aligned with the annular ring. By radially aligned, we mean that a radial line can extend through the bobbin core and the rotor segments, for example. Hybrid module 100 includes radial gap 130 disposed between the outer circumferential surface and the bobbin core, and radial gap 132, less than radial gap 130, disposed between the annular ring outer surface and the bobbin shield.

The hybrid module is arranged such that the annular ring can contact the bobbin shield and none of the plurality of rotor segments can contact the bobbin core. That is, before assembly in a vehicle, the hybrid module is designed such that possible damaging contact between the rotor segments and the bobbin core during shipping, for example. This contact is prevented by contact between the annular ring and the bobbin shield. Assembly may also be eased because an air gap is maintained between the rotor segments and bobbin core, lessening a pull of magnets and allowing for easier positioning during assembly with a transmission as described below.

Hybrid module 100 includes a plurality of bobbin shields 128 with respective inner circumferential surface segments 134 forming inner diameter 136, and a plurality of bobbin cores 126 with respective inner circumferential surface segments 138 forming inner diameter 140. Radial distance 132 between outer diameter 116 and inner diameter 136 is less than radial distance 130 between outer diameter 122 and inner diameter 140.

Rotor 108 includes distal end 142 and distal end 144, axially opposite distal end 142. Bearing 104 is disposed proximate distal end 142 and annular ring 112 is disposed proximate distal end 144. Hybrid module 100 includes torque converter 146 with impeller hub 148 arranged for radial positioning by a transmission. Impeller hub 148 includes an impeller hub bushing 150 arranged for radially positioning the torque converter on a shaft of the transmission. That is, when the hybrid module is assembled to a transmission, the torque converter is installed on a shaft and radially centered by the bushing. The disclosed arrangement maintains an air gap between the rotor segments and the stator cores, lessening a magnetic pull between the two to ease assembly. Once assembled and the torque converter is centered, clearance is maintained between the annular ring and the bobbin shields.

Rotor carrier 110 includes tubular section 152 and annular ring 112. The tubular section is for receiving a plurality of rotor segments 118. The tubular ring includes distal end 142 and distal end 144, axially opposite distal end 142. The annular ring is for fixing to torque converter 146. The annular ring extends radially out from distal end 144 and is integrally formed from a same piece of material as the tubular section. The annular ring includes outer diameter 116 and circumferential protrusion 154 extending axially towards distal end 142. The circumferential protrusion includes outer diameter 156, smaller than outer diameter 116. Rotor carrier 110 includes rotor carrier flange 158 extending radially inward proximate distal end 142. Flange 158 includes positioning diameter 160 for receiving bearing 104. Tubular section 152 includes outer circumferential surface 162. Rotor carrier 110 includes axial slot 164 extending radially inward from the outer circumferential surface. Other embodiments (not shown) may include a rotor carrier with an axial protrusion extending radially outward from the outer circumferential surface.

Rotor 108 includes rotor carrier 110, a plurality of rotor segments 118 installed on tubular section 152, and end plate 166 disposed axially between the plurality of rotor segments and circumferential protrusion 154. Rotor 108 includes end plate 168 disposed axially between the plurality of rotor segments and distal end 142.

Electric motor 106 includes rotor 108 and stator 124. The rotor includes rotor carrier 110. The stator includes bobbin shield 128 with radially inner surface 134 at least partially radially aligned with annular ring 112. Rotor 108 includes a plurality of rotor segments 118 with axial width 170 and the stator includes bobbin core 126 with axial width 172, greater than axial width 170. Each of the plurality of rotor segments includes at least one permanent magnet 174. Stator 124 includes bobbin shield 176. Bobbin shield 128 is installed on a first axial side of the bobbin core and bobbin shield 176 is installed on a second axial side of the bobbin core, opposite the first axial side. Electric motor includes electrical wire 178 wrapped around the bobbin shield 128, bobbin shield 176, and bobbin core 126 to form a plurality of windings.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Hybrid module
102 Housing
104 Bearing
106 Electric motor
108 Rotor
110 Rotor carrier
112 Annular ring
114 Annular ring outer surface
116 Outer diameter (first)
118 Rotor segments
120 Outer circumferential surface (rotor segments)
122 Outer diameter (second)
124 Stator
126 Bobbin core
128 Bobbin shield (first)
130 Radial gap (first)
132 Radial gap (second)
134 Inner circumferential segments (bobbin shields)
136 Inner diameter (first)
138 Inner circumferential segments (bobbin cores)
140 Inner diameter (second)
142 Rotor distal end (first)
144 Rotor distal end (second)
146 Torque converter
148 Impeller hub
150 Impeller hub bushing
152 Tubular section
154 Circumferential protrusion
156 Outer diameter (second, circumferential protrusion)
158 Rotor carrier flange
160 Positioning diameter
162 Outer circumferential surface (tubular section)
164 Axial slot
166 End plate (first)
168 End plate (second)
170 Axial width (first, rotor segments)
172 Axial width (second, bobbin core)
174 Permanent magnet
176 Bobbin shield (second)
178 Electrical wire

What is claimed is:

1. A hybrid module, comprising:
a housing;
a bearing; and,
an electric motor comprising:
a rotor comprising:
a rotor carrier radially positioned by the bearing in the housing, the rotor carrier comprising an annular ring comprising an annular ring outer surface with a first outer diameter; and,
a plurality of rotor segments installed on the rotor carrier, the plurality of rotor segments comprising an outer circumferential surface with a second outer diameter, less than the first outer diameter.

2. The hybrid module of claim 1 wherein the electric motor further comprises:
a stator comprising:
a bobbin core; and,
a bobbin shield installed on the bobbin core.

3. The hybrid module of claim 2 wherein:
the bobbin core is at least partially radially aligned with the plurality of rotor segments; and,
the bobbin shield is at least partially radially aligned with the annular ring.

4. The hybrid module of claim 3 further comprising:
a first radial gap disposed between the outer circumferential surface and the bobbin core; and,
a second radial gap, less than the first radial gap, disposed between the annular ring outer surface and the bobbin shield.

5. The hybrid module of claim 3 wherein the hybrid module is arranged such that the annular ring can contact the bobbin shield and none of the plurality of rotor segments can contact the bobbin core.

6. The hybrid module of claim 3 wherein the stator comprises:
a plurality of bobbin shields comprising respective inner circumferential surface segments forming a first inner diameter; and,
a plurality of bobbin cores comprising respective inner circumferential surface segments forming a second inner diameter.

7. The hybrid module of claim 6 wherein a radial distance between the first outer diameter and the first inner diameter is less than a radial distance between the second outer diameter and the second inner diameter.

8. The hybrid module of claim 1 wherein:
the rotor comprises a first distal end and a second distal end, axially opposite of the first distal end;
the bearing is disposed proximate the first distal end; and,
the annular ring is disposed proximate the second distal end.

9. The hybrid module of claim 1 further comprising a torque converter comprising an impeller hub arranged for radial positioning by a transmission.

10. The hybrid module of claim 9 wherein the impeller hub comprises an impeller hub bushing arranged for radially positioning the torque converter on a shaft of the transmission.

11. A rotor carrier for a hybrid module comprising:
a tubular section for receiving a plurality of rotor segments, comprising:
a first distal end; and,
a second distal end, axially opposite of the first distal end; and,
an annular ring for fixing to a torque converter:
extending radially out from the second distal end and integrally formed from a same piece of material as the tubular section; and,
comprising:
a first outer diameter; and,
a circumferential protrusion extending axially towards the first distal end and comprising a second outer diameter smaller than the first outer diameter.

12. The rotor carrier of claim 11 further comprising a rotor carrier flange extending radially inward proximate the first distal end and including a positioning diameter for receiving a bearing.

13. The rotor carrier of claim 11 wherein the tubular section comprises an outer circumferential surface and the rotor carrier further comprises an axial protrusion extending radially outward from the outer circumferential surface or an axial slot extending radially inward from the outer circumferential surface.

14. A rotor for a hybrid module comprising:
    the rotor carrier of claim 11;
    a plurality of rotor segments installed on the tubular section; and,
    a first end plate disposed axially between the plurality of rotor segments and the circumferential protrusion.

15. The rotor of claim 14 further comprising a second end plate disposed axially between the plurality of rotor segments and the first distal end.

16. An electric motor for a hybrid module comprising:
    a rotor comprising the rotor carrier of claim 11; and,
    a stator comprising a first bobbin shield with a radially inner surface at least partially radially aligned with the annular ring.

17. The electric motor of claim 16 wherein:
    the rotor comprises a plurality of rotor segments with a first axial width; and,
    the stator comprises a bobbin core with a second axial width, greater than the first axial width.

18. The electric motor of claim 17 wherein each of the plurality of rotor segments comprises at least one permanent magnet.

19. The electric motor of claim 17 wherein:
    the stator comprises a second bobbin shield;
    the first bobbin shield is installed on a first axial side of the bobbin core; and,
    the second bobbin shield is installed on a second axial side of the bobbin core, opposite the first axial side.

20. The electric motor of claim 19 further comprising an electrical wire wrapped around the first bobbin shield, the second bobbin shield, and the bobbin core to form a plurality of windings.

* * * * *